(12) United States Patent
Matsui et al.

(10) Patent No.: US 9,442,319 B2
(45) Date of Patent: Sep. 13, 2016

(54) LIQUID CRYSTAL DISPLAY DEVICE

(71) Applicant: Japan Display Inc., Tokyo (JP)

(72) Inventors: Chikae Matsui, Tokyo (JP); Yasushi Tomioka, Tokyo (JP); Takato Hiratsuka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/065,455

(22) Filed: Oct. 29, 2013

(65) Prior Publication Data

US 2014/0125905 A1    May 8, 2014

(30) Foreign Application Priority Data

Nov. 7, 2012  (JP) ................................ 2012-245135

(51) Int. Cl.
*G02F 1/1333* (2006.01)
*G02F 1/1339* (2006.01)
*G02F 1/1343* (2006.01)

(52) U.S. Cl.
CPC ..... *G02F 1/133377* (2013.01); *G02F 1/13394* (2013.01); *G02F 1/134363* (2013.01)

(58) Field of Classification Search
None
See application file for complete search history.

(56) References Cited

U.S. PATENT DOCUMENTS

| | | | |
|---|---|---|---|
| 6,259,503 B1* | 7/2001 | Watanabe et al. | 349/141 |
| 6,704,082 B2* | 3/2004 | Tomioka et al. | 349/123 |
| 8,018,540 B2* | 9/2011 | Shin et al. | 349/38 |
| 2012/0169985 A1* | 7/2012 | Kim et al. | 349/139 |
| 2012/0257156 A1* | 10/2012 | Hiratsuka et al. | 349/143 |
| 2013/0016314 A1* | 1/2013 | Itou | G02F 1/13394 349/106 |
| 2013/0265534 A1* | 10/2013 | Hiratsuka | G02F 1/134363 349/139 |
| 2013/0280661 A1* | 10/2013 | Ishigaki | G03F 7/20 430/319 |
| 2015/0085232 A1* | 3/2015 | Hiratsuka | G02F 1/134363 349/110 |

FOREIGN PATENT DOCUMENTS

| | | |
|---|---|---|
| CN | 102879955 A | 1/2013 |
| JP | 6-214244 | 8/1994 |
| JP | H09-185076 A | 7/1997 |

(Continued)

OTHER PUBLICATIONS

English translation of JP 2002-229029A, Title: Liquid Crystal Display and Method for Manufacturing the Same, Author: Taniguchi Koji; Date of publication: Aug. 14, 2002.*
Chinese Office Action dated on Nov. 26, 2015, for corresponding Chinese Patent Application No. 201310545904.8.

(Continued)

*Primary Examiner* — Dung Nguyen
*Assistant Examiner* — Shan Liu
(74) *Attorney, Agent, or Firm* — Typha IP LLC

(57) ABSTRACT

A liquid crystal display device includes a liquid crystal composition, a thin film transistor substrate as an insulation substrate on which a thin film transistor for controlling the orientation of the liquid crystal composition is provided, and a color filter substrate which seals the liquid crystal composition between itself and the thin film transistor substrate and controls a wavelength region of the transmitted light. The thin film transistor substrate includes a projection part extending from the thin film transistor substrate to the color filter substrate side, and a wall-like electrode on a wall surface of the projection part, which is one electrode for controlling the orientation of the liquid crystal composition. An insulation film and an orientation film are sequentially laminated on the wall-like electrode continuously from a surface parallel to a substrate surface.

3 Claims, 11 Drawing Sheets

(56) References Cited

FOREIGN PATENT DOCUMENTS

| | | | |
|---|---|---|---|
| JP | 2000-347216 A | | 12/2000 |
| JP | 2002229029 A | * | 8/2002 |

OTHER PUBLICATIONS

Office Action from the Japanese Patent Office dated Feb. 9, 2016, for Japanese Patent Application No. 2012-245135.

* cited by examiner

FIG.3

| FILM FORMATION SEQUENCE | KIND OF FILM |
|---|---|
| 1 | MoW |
| 2 | SiN |
| 3 | ORGANIC INSULATION FILM |
| 4 | TRANSPARENT ELECTRODE FILM |
| 5 | SiN |
| 6 | TRANSPARENT ELECTRODE FILM |
| 7 | PAS |
| 8 | POLYIMIDE |

FIG.9

| DISPLAY MODE EFFICIENCY | KIND OF FILM |
|---|---|
| 1 | MoW |
| 2 | SiN |
| 3 | ORGANIC INSULATION FILM |
| 4 | TRANSPARENT ELECTRODE FILM |
| 5 | SiN |
| 6 | TRANSPARENT ELECTRODE FILM |
| 7 | PAS |
| 8 | SiN |
| 9 | POLYIMIDE |

LIQUID CRYSTAL DISPLAY DEVICE

CROSS-REFERENCE TO RELATED APPLICATION

The present application claims priority from Japanese application JP2012-245135 filed on Nov. 7, 2012, the content of which is hereby incorporated by reference into this application.

BACKGROUND OF THE INVENTION

1. Field of the Invention

The present invention relates to a liquid crystal display device.

2. Description of the Related Art

A liquid crystal display device is widely used as a display device of an information communication terminal such as a computer or of a television receiver. The liquid crystal display device is such a device that orientation of a liquid crystal composition sealed between two substrates is changed by change of an electric field, and an image is displayed by controlling a transmission degree of light passing through the two substrates and the liquid crystal composition.

JP 6-214244 A discloses a wall-like electrode in which the film thickness of an electrode portion for changing an electric field is formed to be thicker than that of the other portion, and the electric field is formed by an electrode formed on the side wall surface of the thick portion.

SUMMARY OF THE INVENTION

The wall-like electrode as disclosed in JP 6-214244 A is effective in forming a uniform electric field in a pixel. For example, when white display is performed in a normally black liquid crystal display device, the uniform electric field is formed, so that light transmittance can be increased. However, at the time of black display in which voltage is not applied to the electrode, there is a fear that light leakage occurs and contrast decreases.

The invention is made in view of the above circumstances, and an object thereof is to provide a liquid crystal display device in which display can be appropriately performed even when voltage is not applied to a wall-like electrode and contrast is high.

According to the invention, a liquid crystal display device includes a liquid crystal composition whose orientation is controlled to change an amount of transmitted light, a thin film transistor substrate as an insulation substrate in which a thin film transistor for controlling the orientation of the liquid crystal composition is provided, and a color filter substrate which seals the liquid crystal composition in a space with the thin film transistor substrate and controls a wavelength region of the transmitted light. The thin film transistor substrate includes a projection part extending from the thin film transistor substrate to the color filter substrate side, and a wall-like electrode on a wall surface of the projection part, which is one electrode for controlling the orientation of the liquid crystal composition. An insulation film and an orientation film are sequentially laminated on the wall-like electrode continuously from a surface parallel to a substrate surface.

Besides, in the liquid crystal display device, the wall-like electrode maybe a pixel electrode to which a voltage corresponding to a gradation value of each pixel is applied, and a common electrode as a counter electrode of the pixel electrode is an electrode provided in parallel to the substrate surface of the thin film transistor substrate.

Besides, in the liquid crystal display device, the projection part may be a spacer to form an interval between the thin film transistor substrate and the color filter substrate.

Besides, in the liquid crystal display device, the insulation film may be one of an organic insulation film and an inorganic insulation film, and the inorganic insulation film may be a SiN film.

Besides, in the liquid crystal display device, a thickness of the insulation film may be 0.05 μm to 0.5 μm.

BRIEF DESCRIPTION OF THE DRAWINGS

FIG. 3 is a table showing a film formation sequence of films formed on a thin film transistor of a thin film transistor substrate of FIG. 2.

FIG. 9 is a table showing a film formation sequence of films formed on a thin film transistor of a thin film transistor substrate of FIG. 8.

DETAILED DESCRIPTION OF THE INVENTION

Figure 10:
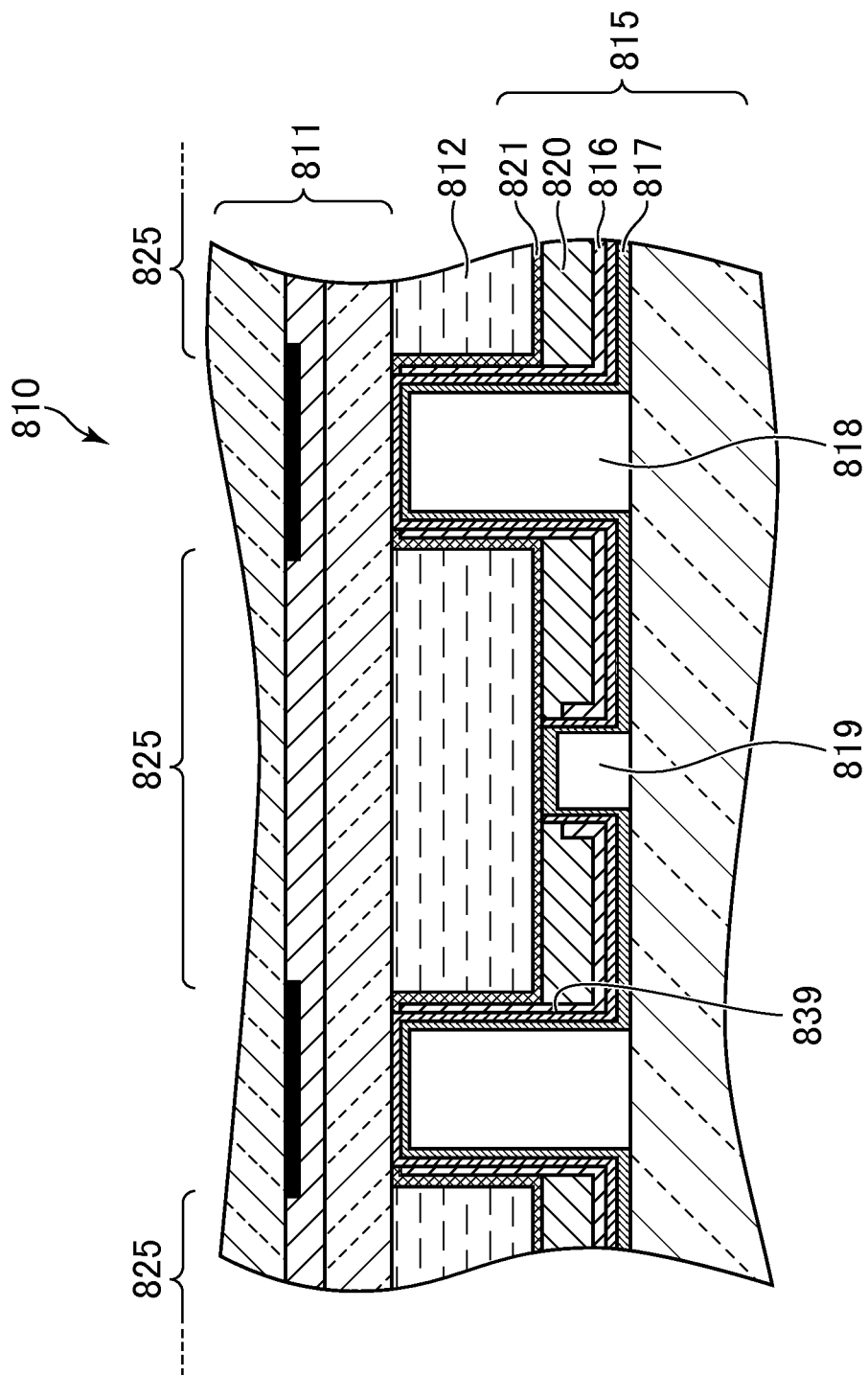
FIG. 10 is a view showing a liquid crystal display panel including a wall-like electrode of a comparative example of the invention.

First, a normally black liquid crystal panel 810 including a wall-like electrode of a comparative example of the invention shown in FIG. 10 will be described. FIG. 10 schematically shows an example of a section of a pixel of the liquid crystal panel 810. As shown in this drawing, the liquid crystal panel 810 includes a color filter substrate 811, a thin film transistor substrate 815, and a liquid crystal composition 812 sandwiched and sealed between the substrates. The thin film transistor substrate 815 includes a large projection 818 formed between pixels 825, and a small projection 819 formed in the pixel 825, and further includes a pixel electrode 816 having a wall-like electrode 839 which is provided on a wall surface of the large projection 818 and forms an electric field acting on the liquid crystal composition 812, and a common electrode 817 which is a counter electrode of the pixel electrode 816, is provided on an upper surface of the small projection 819 and forms an electric field acting on the liquid crystal composition 812. In each of the pixels 825, an organic insulation film 820 is formed so as to cover the pixel electrode 816. As shown in this drawing, an orientation film 821 is desirably uniformly formed on the organic insulation film 820, the wall-like electrode 839, and the common electrode 817 on the upper surface of the small projection 819 so as to have a uniform thickness on the surface which the liquid crystal composition 812 contacts.

Figure 11:
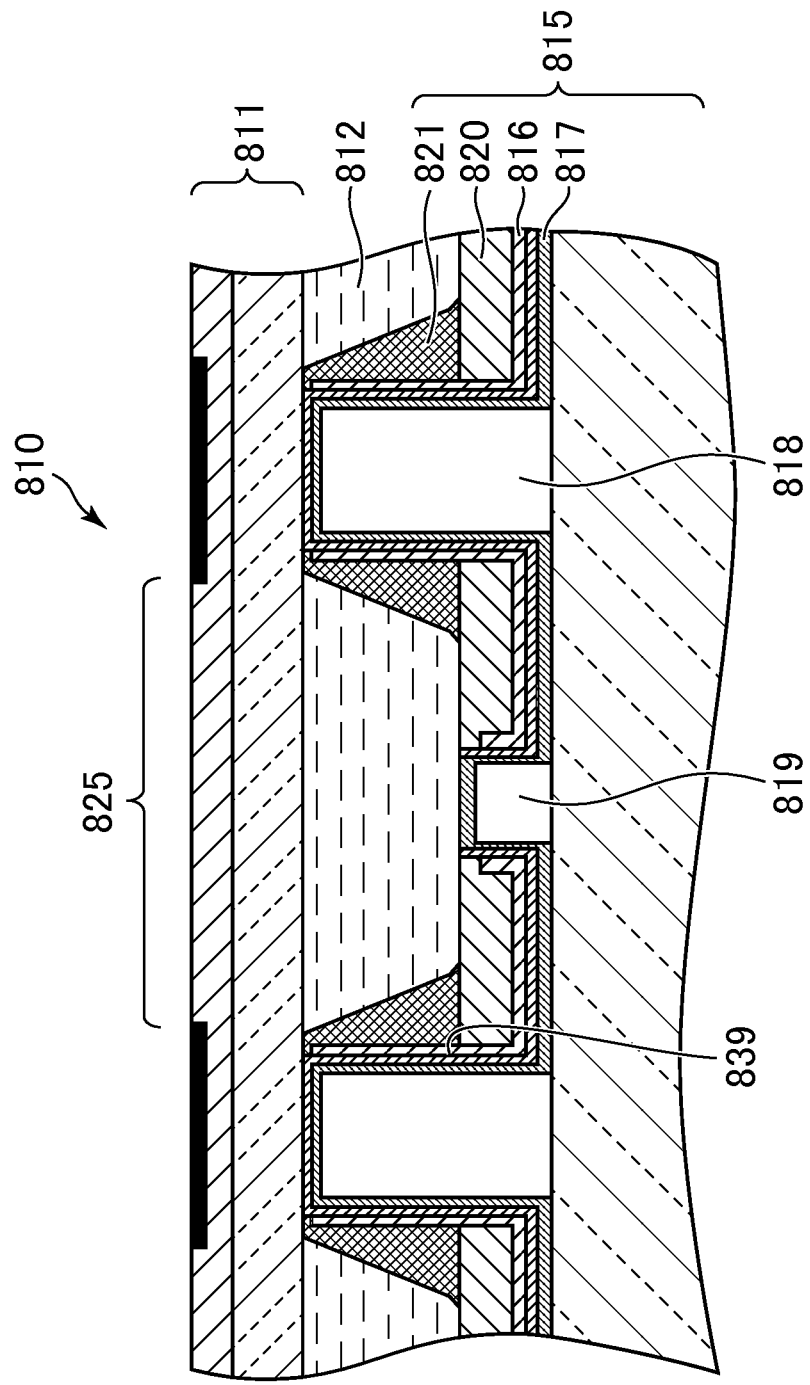
FIG. 11 is a view showing a liquid crystal display panel including a wall-like electrode of a comparative example of the invention.

However, according to the research of the inventors, it was found that when the orientation film 821 was formed on the films laminated as described above, the orientation film 821 was mainly formed on the wall-like electrode 839 as shown in FIG. 11 and was hardly formed on the organic insulation film 820 between the walls because of a difference in surface energy between the material of the organic insulation film 820 and the material of the pixel electrode 816. When the orientation film 821 is unevenly formed as shown in FIG. 11, since the orientation of the liquid crystal composition 812 becomes worse in an area between the walls where the orientation film is thin, light leakage at the time of black display is liable to occur, and further, the light leakage at the time of black display is liable to occur also by burning due to application of a signal voltage. Accordingly, contrast in image display is decreased.

Hereinafter, first and second embodiments of the invention will be described with reference to the drawings. Incidentally, in the drawings, the same or like components are denoted by the same reference numerals and a duplicate description is omitted.

First Embodiment

Figure 1:
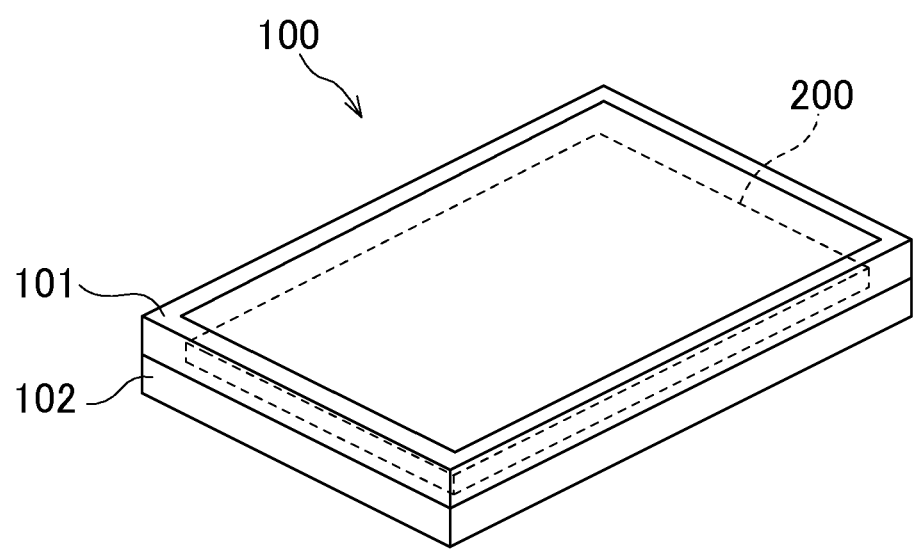
FIG. 1 is a view schematically showing a liquid crystal display device of a first embodiment of the invention.

FIG. 1 schematically shows a liquid crystal display device 100 of the first embodiment of the invention. As shown in this drawing, the liquid crystal display device 100 includes a liquid crystal display panel 200 fixed to be sandwiched between an upper frame 101 and a lower frame 102. Here, in this embodiment, a description is made on an example of a so-called normally black liquid crystal display panel in which black display is performed when voltage is not applied to an electrode. However, no limitation is made to this, and the invention can be applied also to a normally white liquid crystal display panel.

Figure 2:
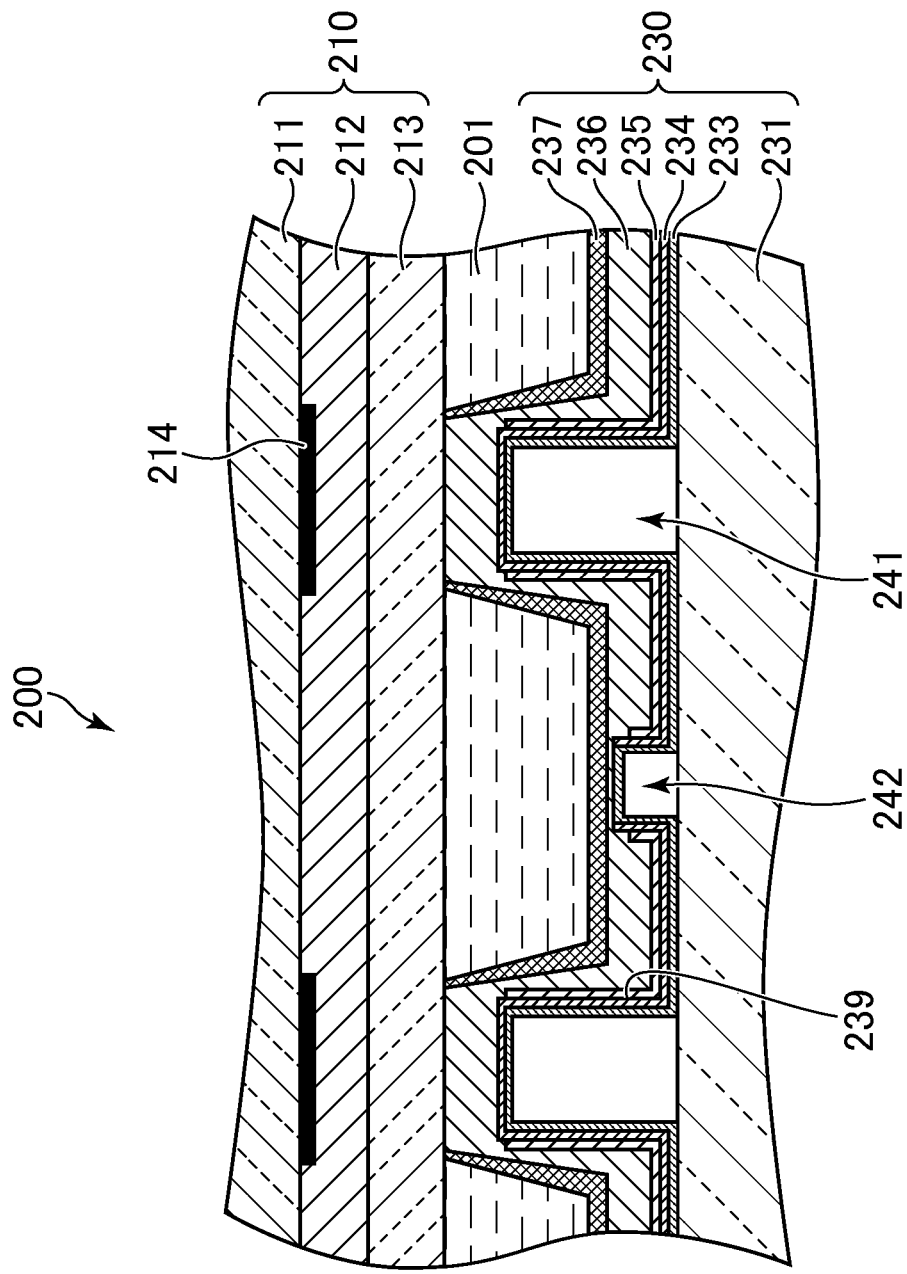
FIG. 2 is a view schematically showing a part of a section of a pixel of a liquid crystal display panel of FIG. 1.

FIG. 2 is a view schematically showing a part of a section of a pixel of the liquid crystal display panel 200. As shown in this drawing, the liquid crystal display panel 200 includes a color filter substrate 210, a thin film transistor substrate 230, and a liquid crystal composition 201 sandwiched therebetween. The color filter substrate 210 is provided with a black matrix 214 formed on a glass insulation substrate 211 and for preventing light leakage from adjacent pixels, a color filter 212 to determine a wavelength region of transmitted light, and an overcoat layer 213 to protect them.

The thin film transistor substrate 230 includes a glass substrate 231 on which a not-shown thin film transistor is formed. A large projection 241 which is made of an organic insulation film, is formed between the pixels and extends from a substrate surface, and a small projection 242 which is formed in the pixel and extends from the substrate surface are provided on the thin film transistor through an insulation film. Further, the thin film transistor substrate 230 includes a common electrode 233 which is formed on the whole surface of a display region so as to cover the large projection 241 and the small projection 242 and is made of a transparent electrode of, for example, ITO, an inorganic insulation film 234 which is made of, for example, SiN and is for insulation from an after-mentioned pixel electrode 235, the pixel electrode 235 which includes at least a wall-like electrode 239 formed on a wall surface of the large projection 241 and is made of a transparent electrode of, for example, ITO, an organic insulation film 236 which is not formed or is thinly formed on the common electrode 233 formed on the upper surface of the small projection 242 and is formed on the large projection 241 and its wall surface, and an orientation film 237 formed along the surface of the organic insulation film 236.

Here, as shown in FIG. 2, in this embodiment, the orientation film 237 is not formed on the upper surface of the large projection 241, and the organic insulation film 236 is formed to contact the color filter substrate 210. By this, the large projection 241 and the film formed on the upper surface function also as a spacer to determine an interval between the thin film transistor substrate 230 and the color filter substrate 210. However, no limitation is made to this embodiment, and the orientation film 237 may be formed on the upper surface of the large projection 241, or the liquid crystal composition 201 maybe disposed between the large projection 241 and the color filter substrate 210.

FIG. 3 is a table showing a film formation sequence of films formed on the thin film transistor of the thin film transistor substrate 230 of the embodiment. As shown in this table, after a part of wiring of the thin film transistor is formed of MoW, a SiN film as the insulation film is formed, and the large projection 241 and the small projection 242 are formed of organic insulation films thereon. Thereafter, the common electrode 233 is formed of a transparent electrode film of ITO or the like, and the inorganic insulation film 234 is formed of SiN thereon. Further, after a transparent electrode film of ITO or the like, which becomes the pixel electrode 235, is formed, the organic insulation film 236 is formed, and a polyimide film which becomes the orientation film 237 is formed thereon by a photo-orientation process. Here, the film formation process of each film includes a process of patterning by photolithography or the like according to the need.

Figure 4:
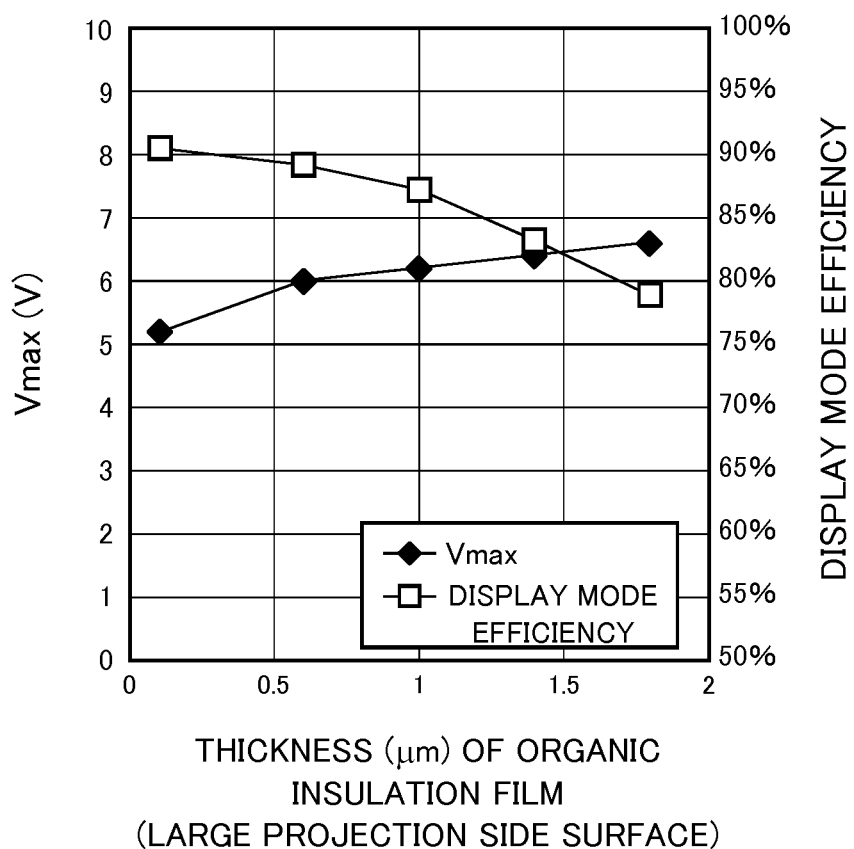
FIG. 4 is a graph showing a drive voltage required for display and a display mode efficiency with respect to the thickness of an organic insulation film at a side portion of a large projection.

FIG. 4 is a graph showing a drive voltage required for display and a display mode efficiency corresponding to a light transmittance at the time of white display with respect to the thickness of the organic insulation film 236 at a side portion of the large projection 241. As shown in this graph, it is understood that as the thickness of the organic insulation film 236 increases, the display mode efficiency decreases, the required drive voltage Vmax increases, and power consumption increases. Based on the detailed examination of the inventors, it is desirable that the film formation is performed in a range of 0.05 µm to 0.5 µm in which less influence is exerted on these values.

As described above, according to this embodiment, the insulation film is formed also on the wall surface of the large projection continuously from the surface parallel to the substrate surface in the pixel, and the orientation film is formed thereon. Thus, the orientation film is formed also on the surface parallel to the substrate surface, and appropriate display can be performed even when a voltage is not applied to the wall-like electrode, for example, at the time of black display of a normally black liquid crystal display device or at the time of white display of a normally white liquid crystal display device. By this, the contrast of the display device can be improved.

Figure 5:
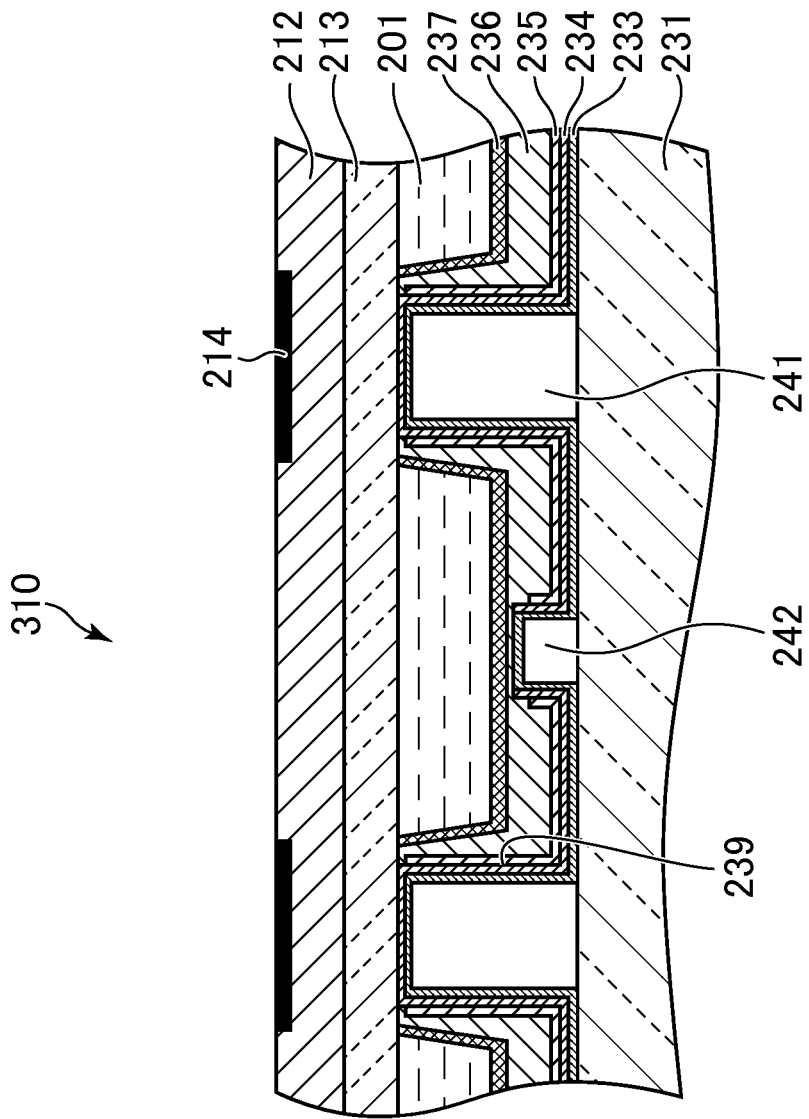
FIG. 5 is a view showing a liquid crystal display panel of modified example 1 of the first embodiment in the same viewing field as that of FIG. 2.

FIG. 5 is a view showing a liquid crystal display panel 310 of modified example 1 of the first embodiment in the same viewing field as that of FIG. 2. As shown in this drawing, in the modified example 1, an organic insulation film 236 is not formed on an upper surface of a large projection 241. Also in the structure as stated above, the same effect as that of the first embodiment can be obtained.

Figure 6:
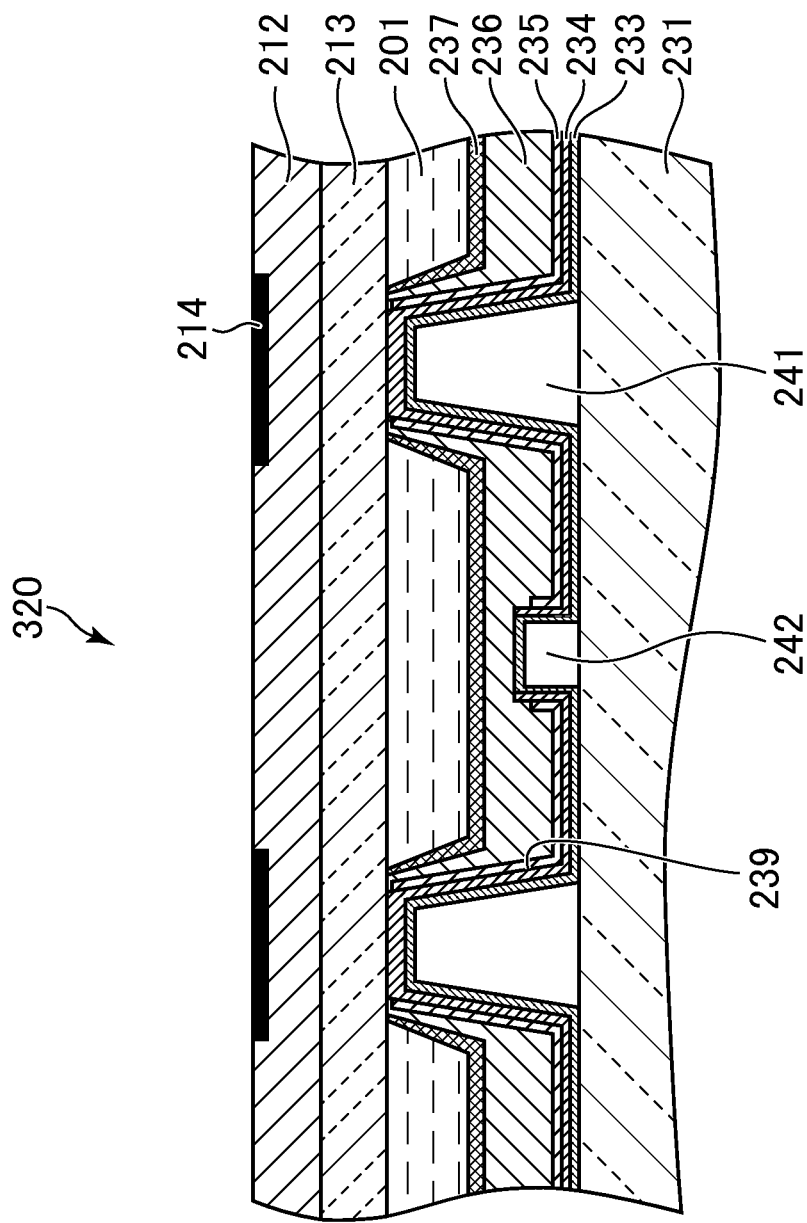
FIG. 6 is a view showing a liquid crystal display panel of modified example 2 of the first embodiment in the same viewing field as that of FIG. 2.

FIG. 6 is a view showing a liquid crystal display panel 320 of modified example 2 of the first embodiment in the same viewing field as that of FIG. 2. As shown in this drawing, in the modified example 2, in addition to the structure of the modified example 1, a large projection 241 is taper-shaped. By the structure as stated above, the same effect as that of the first embodiment can be obtained, and further, an organic insulation film 236 and an orientation film 237 can be more uniformly formed on the side surface of the large projection 241.

Figure 7:
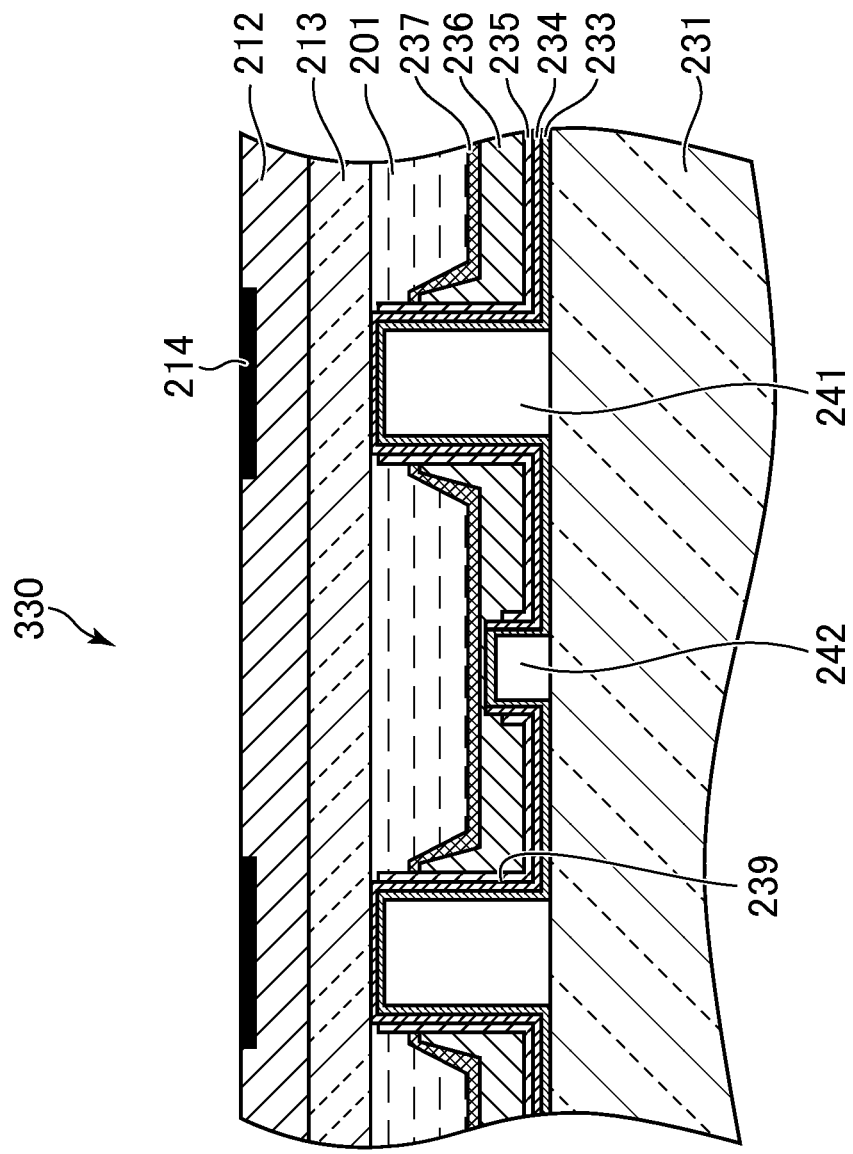
FIG. 7 is a view showing a liquid crystal display panel of modified example 3 of the first embodiment in the same viewing field as that of FIG. 2.

FIG. 7 is a view showing a liquid crystal display panel 330 of modified example 3 of the first embodiment in the same viewing field as that of FIG. 2. As shown in this drawing, in the modified example 3, an organic insulation film 236 is not formed on a wall surface upper portion of a large projection 241. Even in the structure as stated above, since the organic insulation film 236 is formed on a wall surface lower portion of the large projection 241 where an orientation film 237 is liable to stay. Thus, the orientation film 237 is uniformly formed in a pixel, and the same effect as that of the first embodiment can be obtained.

Second Embodiment

Figure 8:
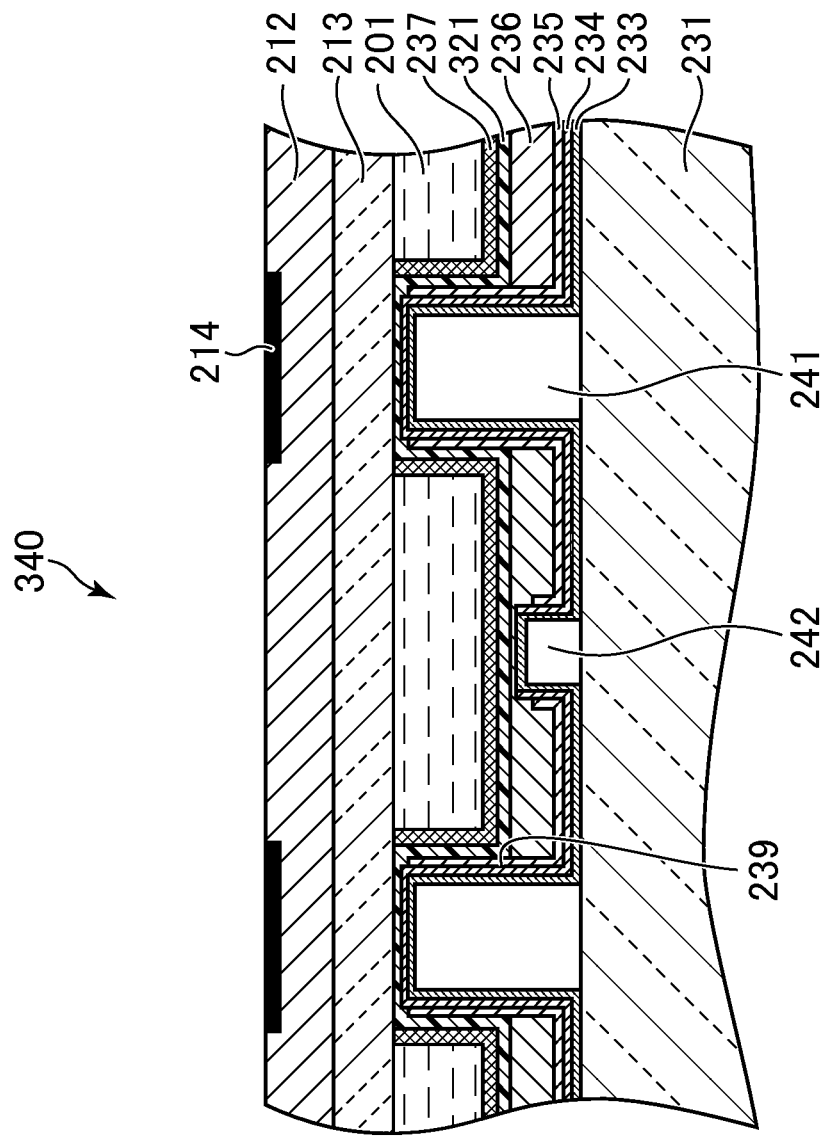
FIG. 8 is a view schematically showing a part of a section of a pixel of a liquid crystal display panel of a liquid crystal display device of a second embodiment.

Since the whole structure of a liquid crystal display device of the second embodiment is the same as the whole structure of the liquid crystal display device 100 of the first embodiment shown in FIG. 1, the description thereof is omitted. FIG. 8 is a view schematically showing a part of a section of a pixel of a liquid crystal display panel 340 of the liquid crystal display device of the second embodiment. A different point from the liquid crystal display panel 200 of the first embodiment is that an organic insulation film 236 is merely formed around a large projection 241 so as to have almost the same height as that of a small projection 242, and an inorganic insulation film 321 made of, for example, SiN is formed so as to cover the organic insulation film 236 and the large projection 241. An orientation film 237 is formed on the inorganic insulation film 321 similarly to the first embodiment.

Also in the case of this structure, similarly to the first embodiment, the insulation film is formed also on the wall surface of the large projection continuously from the surface parallel to the substrate surface in a pixel, and the orientation film is laminated thereon. Thus, the orientation film is formed also on the surface parallel to the substrate surface, and appropriate display can be performed even when a voltage is not applied to a wall-like electrode, for example, at the time of black display of a normally black liquid crystal display device or at the time of white display of a normally white liquid crystal display device. By this, the contrast of the display device can be improved.

Further, since the inorganic insulation film 321 can be formed by a method such as CVD (Chemical Vapor Deposition), the film can be formed to be thinner than the organic insulation film. Thus, as shown in the graph of FIG. 4, the above effect can be obtained without influencing the display mode efficiency and the drive voltage Vmax.

FIG. 9 is a table showing a film formation sequence of films formed on a thin film transistor of a thin film transistor substrate of the liquid crystal display panel 340 of the second embodiment. A different point from FIG. 3 is that the SiN film of the inorganic insulation film 321 is formed at the eighth step of the film formation sequence. Since the others are the same as those of FIG. 3, the description thereof is omitted.

In the foregoing embodiments, although the common electrode is provided only on the thin film transistor substrate side, for example, the common electrode may be provided also on the color filter substrate side through the liquid crystal composition.

Besides, in the foregoing embodiments, although the pixel electrode is arranged in the wall-like electrode, and the common electrode is arranged at the center in the pixel of the thin film transistor substrate, the arrangement of the pixel electrode and the common electrode may be reverse to this.

Besides, in the foregoing embodiments, although the insulation film and the orientation film are directly formed on the wall-like electrode, another layer may be formed between the wall-like electrode and the insulation film.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device comprising:
   a liquid crystal composition whose orientation is controlled to change an amount of light which travels through pixels;
   a thin film transistor substrate as an insulation substrate on which a thin film transistor for controlling the orientation of the liquid crystal composition is provided; and
   a color filter substrate which seals the liquid crystal composition in a space with the thin film transistor substrate and controls a wavelength region of the transmitted light, wherein
   the thin film transistor substrate has the pixels, and every one of the pixels comprises
      a large projection having a large wall surface and a small projection having a small wall surface, and extending from the thin film transistor substrate to the color filter substrate side,
      a planar portion between the large projection and the small projection,
      a common electrode continuously formed on the large projection, the small projection, and the planar portion,
      a first insulation film on the common electrode,
      a pixel electrode formed on the common electrode through the first insulation film, the pixel electrode formed above the large wall surface, the small wall surface, and the planar portion,
      a second insulation film, which is an organic insulation film on the pixel electrode over the large projection, the small projection, and the planar portion, and
      an alignment film formed on the pixel electrode through the second insulation film,
      the second insulation film having a greater thickness above the planar portion than the small projection.

2. The liquid crystal display device according to claim 1, wherein the large projection is a spacer to form an interval between the thin film transistor substrate and the color filter substrate.

3. The liquid crystal display device according to claim 1, wherein a thickness of the second insulation film above the large wall surface is 0.05 µm to 0.5 µm.

* * * * *